US006854687B1

(12) United States Patent
Morgenstern et al.

(10) Patent No.: US 6,854,687 B1
(45) Date of Patent: Feb. 15, 2005

(54) NACELLE INTEGRATION WITH REFLEXED WING FOR SONIC BOOM REDUCTION

(75) Inventors: John M. Morgenstern, Lancaster, CA (US); Alan E. Arslan, Santa Clarita, CA (US); Joshua P. Barbieri, Lancaster, CA (US)

(73) Assignee: Supersonic Aerospace International, Inc., Las Vegas, NV (US)

( * ) Notice: Subject to any disclaimer, the term of this patent is extended or adjusted under 35 U.S.C. 154(b) by 0 days.

(21) Appl. No.: 10/713,515

(22) Filed: Nov. 11, 2003

(51) Int. Cl.$^7$ .............................................. B64C 30/00

(52) U.S. Cl. ........................ 244/15; 244/55; 244/130; 244/1 N

(58) Field of Search ................................ 244/15, 35 R, 244/35 A, 45 R, 130, 1 N, 54, 55

(56) References Cited

U.S. PATENT DOCUMENTS

| | | | | | |
|---|---|---|---|---|---|
| 2,997,256 | A | * | 8/1961 | Walker ........................ | 244/15 |
| 3,137,460 | A | * | 6/1964 | Owl, Jr. et al. ............ | 244/53 B |
| 3,310,262 | A | * | 3/1967 | Robins et al. ............. | 244/45 R |
| 3,391,884 | A | * | 7/1968 | Carhartt ..................... | 244/34 R |
| 4,598,886 | A | * | 7/1986 | Friebel et al. ................ | 244/15 |
| 5,358,156 | A | * | 10/1994 | Rethorst ...................... | 244/15 |
| 6,588,703 | B1 | * | 7/2003 | Hartmann ................. | 244/35 R |

OTHER PUBLICATIONS

Sriram K. Rallabhandi and Dimitri N. Mavris, An Unstructed Wave Drag Code For Preliminary Design of Future Supersonic Aircraft, American Institute of Aeronautics and Astronautics Paper, pp. 1–8, Aerospace Systems Design Lab, Georgia Tech, Atlanta.

Minoru Yoshimoto, Naoki Uchiyama, Optimization of Canard Surface Positioning of Supersonic Business Jet for Low Boom and Low Drag Design, American Institute of Aeronautics and Astronautics, 2003, pp. 1–10, AIAA 2003–3576, 33rd AIAA Fluid Dyanics Conference and Exhibit, Orlando, Florida, Jun. 23–27, 2003.

Yoshikazu Makino, Ken'ichiro Suzuki, Masayoshi Noguchi and Kenji Yoshida, Non–Axisymmetrical Fuselage Shape Modification for Drag Reduction of a Low Sonic–Boom Airplane, American Institute of Aeronautics and Astronautics, 2003, pp. 1–11, AIAA 2003–557, 41st Aerospace Sciences Meeting and Exhibit. Jan. 6–9, 2003, Reno, Nevada.

Donald C. Howe, Sonic Boom Reduction Through the Use of Non–Axsymmetric Configuration Shaping, American Institute of Aeronautics and Astronautics, 2003, pp. 1–9, AIAA 2003–929, 41st Aerospace Sciences Meeteing and Exhibit, Jan. 6–9, 2003, Reno, Nevada.

(List continued on next page.)

*Primary Examiner*—Galen Barefoot
(74) *Attorney, Agent, or Firm*—Koestner Bertani LLP

(57) ABSTRACT

A method for integrating an engine nacelle below the wing of a supersonic aircraft with low sonic boom capabilities includes determining the shape of a reflexed portion of the airfoil on the underside of the wing, and a corresponding shape for the upper surface of the nacelle to provide favorable interaction between the wing and the nacelle. In some configurations, the reflex and/or the nacelle are shaped to maintain positive pressure under the reflexed portion of the wing, to the trailing edge of the wing. A gull dihedral wing is designed to form a partial shroud around the nacelle. Such configurations reduce drag at the trailing edge of the wing, and the force of the positive pressure on the gull dihedral wing portion provides additional lift that partially offsets drag from the nacelle.

21 Claims, 12 Drawing Sheets

OTHER PUBLICATIONS

Charbel Farhart, Brian Argrow, Melike Nikbay and Kurt Maute, A Shape Optimization Methodology with F–Function Lobe Balancing for Mitigating the Sonic Boom, American Institute of Aeronautics and Astronautics, 2002, pp. 1–9, AIAA 2002–5551, 9th AIAA/ISSMO Symposium on Multidisciplinary Analysis and Optimization, Sep. 4–6, 2002, Atlanta Georgia.

Frank Marconi, Rodney D.W. Bowersox and Joseph A. Schetz, Sonic Boom Alleviation Using Keel Configurations, Journal of Aircraft, vol. 40, No. 2, Mar.–Apr. 2003, pp. 363–369.

Christine M. Darden, Sonic Boom Minimization with Nose-Bluntness Relaxation, NASA, 1979, pp. 1–50, NASA Technical Paper 1348, USA.

* cited by examiner

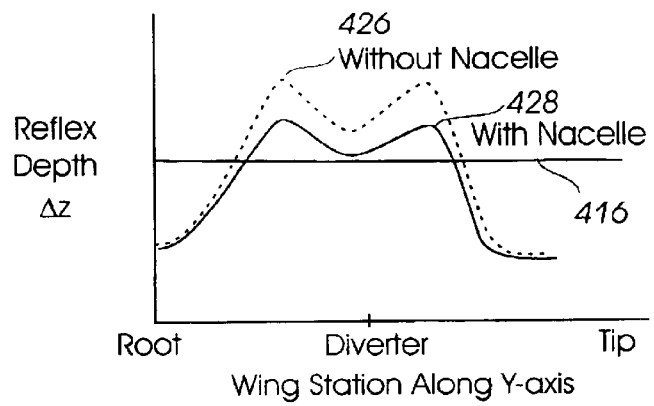
FIG. 4C
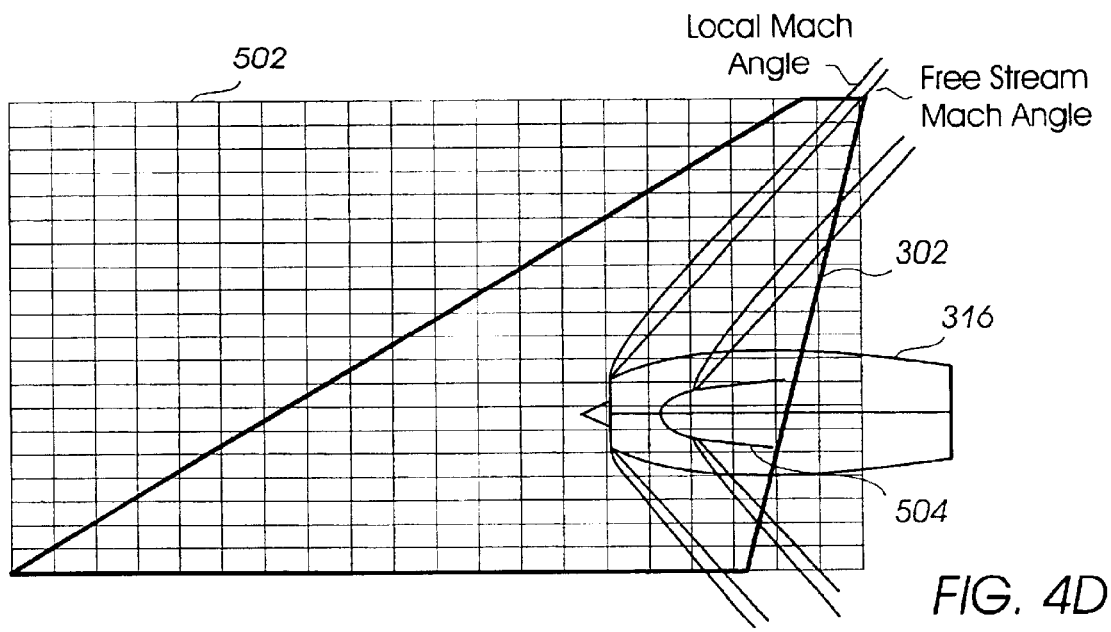
FIG. 4D
FIG. 4E
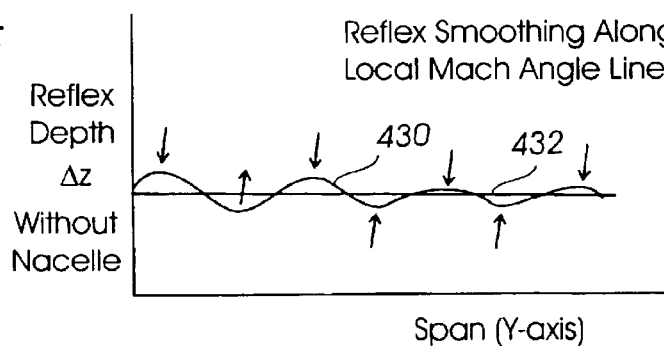

NACELLE INTEGRATION WITH REFLEXED WING FOR SONIC BOOM REDUCTION

BACKGROUND OF THE INVENTION

Supersonic flight over the United States and other countries is a challenging environmental issue for a viable supersonic commercial aircraft. Current FAA regulations prohibit civil flights at Mach numbers greater than one without case-by-case exceptions approved by the Administrator. Many other countries have similar restrictions.

Previous research has shown that the highly impulsive nature of the "N-wave" sonic-boom signatures of all existing supersonic aircraft is the primary cause of negative response and regulatory limitations on supersonic travel. Conclusions of NASA research further indicate the exceptional difficultly of designing an aircraft with an "N-wave" signature of sufficiently low amplitude for general public acceptance. However, the research also found that a "shaped" signature was less annoying and that a reasonably achievable amplitude wave could meet a 1995 CHABA (Committee on Hearing and Bioacoustics of the National Research Council) guideline for acceptable noise impact to the general public, depending on frequency of exposure.

A sonic boom occurs due to pressure waves that occur when an aircraft moves at supersonic speeds. During subsonic flight, air displaced by a passing plane flows around the plane in the manner water flows around an object in a stream. However, for a plane flying at supersonic speeds, the air cannot easily flow around the plane and is instead compressed, generating a pressure pulse through the atmosphere. The pressure pulse intensity decreases as a consequence of movement from the airplane, and changes shape into an N-shaped wave within which pressure raises sharply, gradually declines, then rapidly returns to ambient atmospheric pressure. A wall of compressed air that moves at airplane speed spreads from the wave and, in passing over ground, is heard and felt as a sonic boom. The rapid changes in pressure at the beginning and end of the N-wave produce the signature double bang of the sonic boom.

Research has shown that boom intensity can be reduced by altering aircraft shape, size, and weight. For example, small airplanes create a smaller amplitude boom due to a lower amount of air displacement. Similarly, a lighter aircraft produces a smaller boom since an airplane rests on a column of compressed air and a lighter plane generates a lower pressure column. An aircraft that is long in proportion to weight spreads the N-wave across a greater distance, resulting in a lower peak pressure. Furthermore, wings that are spread along the body and not concentrated in the center as in a conventional aircraft produces a pressure pulse that is similarly spread, resulting in a smaller sonic boom.

Shaping of a sonic boom refers to a technique of altering source pressure disturbance such that a non-N-wave shape is imposed on the ground. Shaping sonic boom can reduce loudness by 15–20 dB or more with no added energy beyond that to sustain flight. Shaping to minimize loudness is based on insight regarding changes in aircraft pressure disturbances during propagation to the ground.

Shaped sonic booms are only achieved deliberately. No existing aircraft creates a shaped sonic boom that persists for more than a fraction of the distance to the ground while flying at an efficient cruise altitude since non-shaped pressure distributions quickly coalesce into the fundamental N-wave shape. The N-wave form generates the largest possible shock magnitude from a particular disturbance. The N-wave shape results because the front of a supersonic aircraft generates an increase in ambient pressure while the rear generates a decrease in pressure. Variation in propagation speed stretches the disturbance during propagation to the ground. Shaped boom techniques typically attempt to prevent coalescing of the pressure disturbance by adding a large compression at the aircraft nose and an expansion at the tail with pressure in between constrained between the compression and expansion. The shaped boom stretches the ends of the signature faster than the in-between pressures, creating a non-N-wave sonic boom at the ground.

Boom reduction makes a supersonic aircraft less objectionable by minimizing the loudness of a sonic boom. Audible frequencies in a sonic boom occur in the rapid pressure changes, or shocks, at the beginning and end of the typical N-waveform. More quiet shocks have decreased pressure amplitudes and increased pressure change time durations.

Although sonic boom reduction is an important design criterion for a supersonic aircraft, other considerations always impact design decisions. For example, a useful aircraft will have an appropriate capacity for holding passengers and/or cargo and be a suitable configuration for safe operation. Most low boom supersonic aircraft designs place the engines at the aft fuselage on top of the wing to avoid adding the effects of nacelle shock waves to the shock waves of the airframe of the wing. Performance considerations, however, favor positioning the nacelles under the wing. Nacelles mounted on the aft portion of the wing tend to reduce the wing and nacelle wave drag. Such nacelles mounted under the wing tend to induce an increase in lift, thereby improving the lift to drag ratio, whereas nacelles on top of the wing tend to reduce lift, thereby adversely affecting the lift to drag ratio.

SUMMARY OF THE INVENTION

What is desired is a supersonic aircraft that combines the performance advantages of engine nacelles mounted under the wing with low sonic boom disturbance during flight.

In accordance with some embodiments, a method for integrating an engine nacelle under a wing for a supersonic aircraft includes constraining the pressures under a reflexed airfoil portion of the wing to canceling only positive pressures. The reflexed airfoil portion includes a convergent section thickness of the underside of the wing that begins at an intermediate location between the leading edge and the trailing edge of the wing, and extends to the trailing edge of the wing. The shape of the convergent section thickness is formed with at least one reflex angle. The slope of the at least one reflex angle can be constrained to values greater than or equal to zero. The slope of the reflex angle that meets the pressure and reflex angle slope constraints is then determined.

According to other embodiments, an aircraft includes a wing with a non-movable reflexed airfoil portion. The reflexed airfoil portion includes a convergent section thickness of the underside of the wing that begins at an intermediate location between the leading edge and the trailing edge of the wing, and extends to the trailing edge of the wing. The shape of the convergent section thickness is defined by at least one reflex angle, and the slope of the at least one reflex angle can be constrained to be greater than or equal to zero.

In additional embodiments, an aircraft design system includes logic instructions operable to determine the shape of a reflexed airfoil portion of a wing, allow the user to constrain the pressures under the reflexed airfoil portion to canceling only positive pressures, and to vary the thickness of a nacelle under the wing to meet the pressure constraint.

The wing and nacelle are shaped and positioned in a manner that reduces sonic-boom disturbance. In some examples the wing gull wraps around the nacelle and enhances favorable interaction between the engine nacelle and the wing, resulting in lower drag and greater lift that improves range and lowers the acoustic signature of the aircraft during supersonic flight.

BRIEF DESCRIPTION OF THE DRAWINGS

Embodiments of the invention relating to both structure and method of operation, may best be understood by referring to the following description and accompanying drawings.

FIG. 4C shows a graphical depiction of the wing reflex depth of along the wing span with and without the nacelle boundary conditions included in the CFD analysis.

FIG. 4D shows a top view of free stream and local Mach angle lines relative to a wing and an engine nacelle.

FIG. 4E shows a graphical depiction of smoothing finite pressure difference computational results for wing reflex depth along local Mach angle lines.

DETAILED DESCRIPTION OF THE EMBODIMENTS

Figure 1:
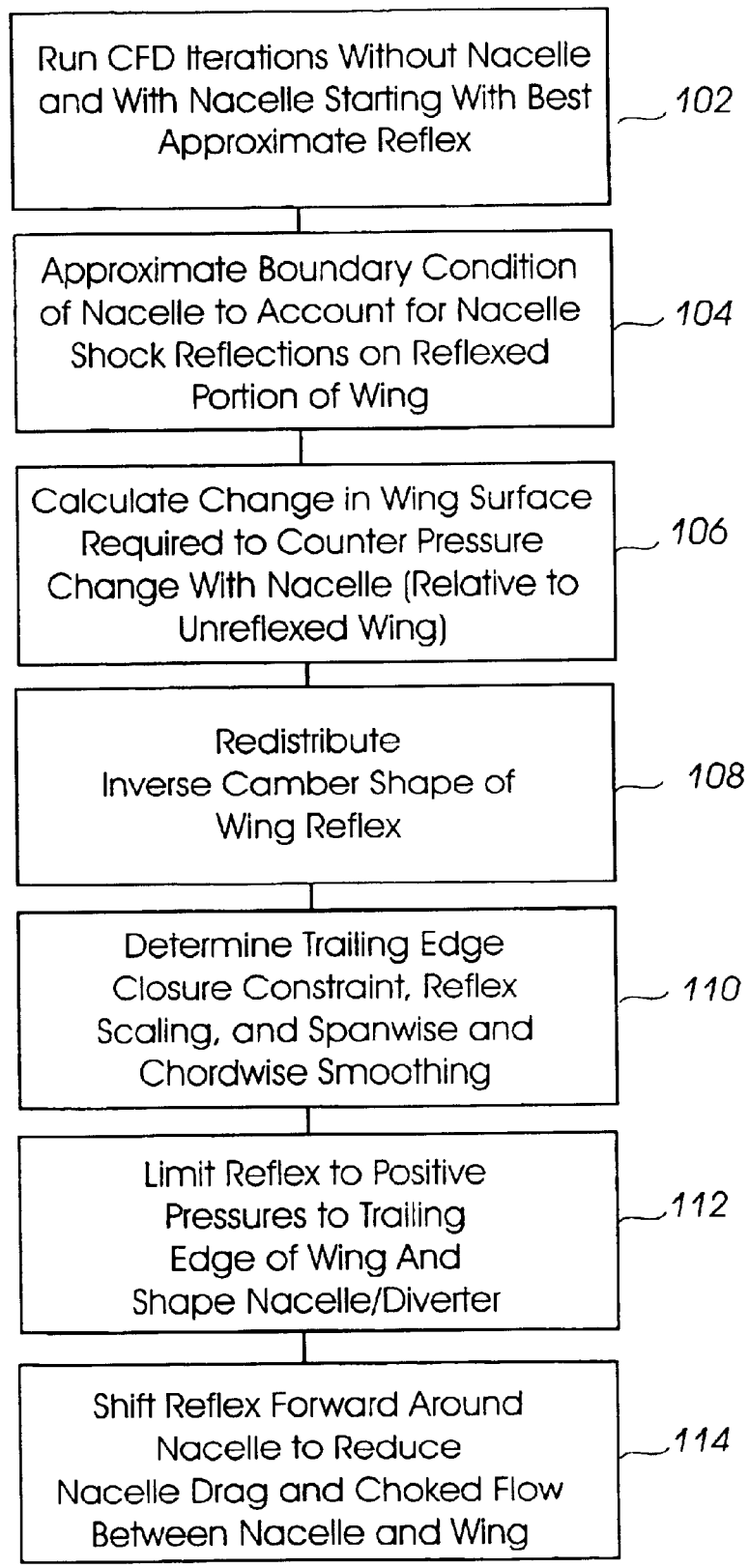
FIG. 1 shows a flow diagram of an embodiment of a procedure for integrating a reflexed wing with an engine nacelle for a supersonic aircraft with reduced sonic boom.

Referring to FIGS. 1, a flow diagram of an embodiment of a procedure for integrating a reflexed wing with an engine nacelle for a supersonic aircraft with reduced sonic boom capabilities is shown. Processes 102 through 114 can be utilized to determine the shape of a reflexed wing and a corresponding engine nacelle, as further described in the discussion of FIGS. 3A through 6F. Generally, at least some of processes 102 through 114 can be implemented as hardware and/or software logic instructions that are executable on a suitable computational system, such as one or more computer processors coupled to data input and output components.

Figure 2:
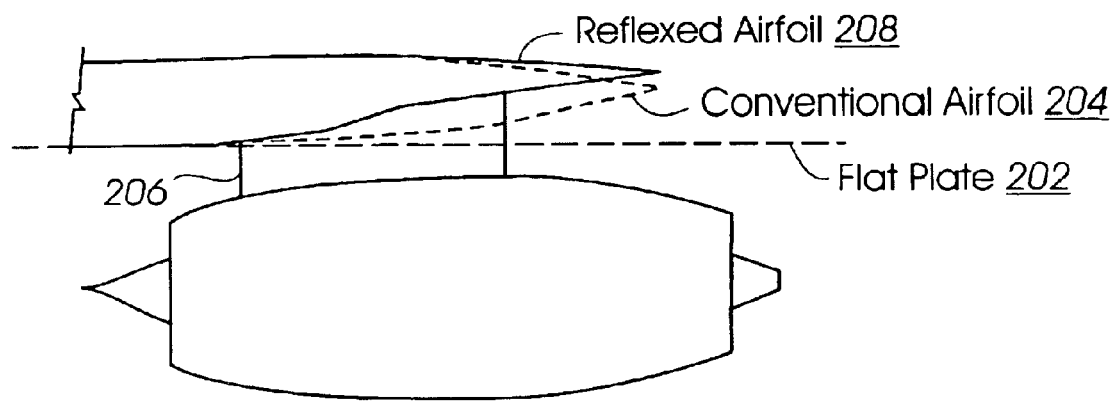
FIG. 2 shows examples of options for starting wing shape at the beginning of a series of computational fluid dynamics (CFD) analysis iterations.

Various design constraints can be applied to parameters in processes 102 through 114. Process 102 typically includes performing computational fluid dynamics (CFD) iterations with and without an engine nacelle. In addition to performing CFD iterations with and without an engine nacelle, process 102 includes determining an initial reflex angle for an airfoil portion with which to start the CFD iterations. FIG. 2 shows some of the options for initializing CFD iterations, including a flat plate 202, conventional airfoil 204 and diverter 206, or reflexed airfoil portions 208 and diverter 206. The number of CFD iterations required to close on a final configuration can be dramatically reduced by starting with the closest known approximation to the desired reflexed airfoil portion 208 available.

Figure 3A:
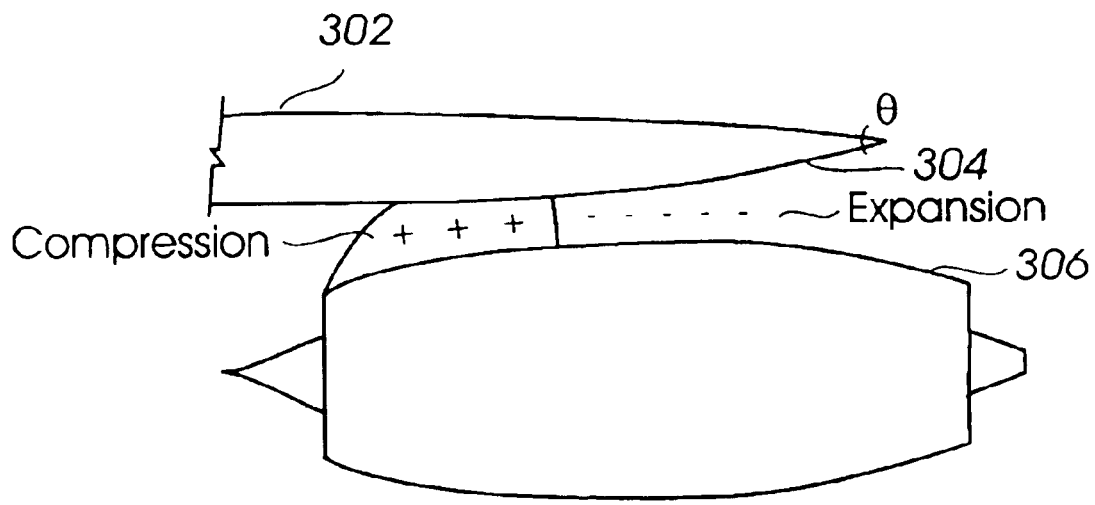
FIG. 3A shows a side view of compression and expansion of airflow between a wing with a conventional airfoil and an engine nacelle.

Process 102 can also include determining the shape of the nacelle and the reflex for the wing. A side view of compression and expansion of airflow between a wing 302 with a conventional, unreflexed airfoil 304 and an engine nacelle 306 is shown in FIG. 3A. The compressed airflow (denoted by "+" signs) results from the narrowing of the distance between the underside of wing 302 and upper surface of nacelle 306. As the airflow moves past the most narrow distance between wing 302 and nacelle 306 toward the trailing edge of wing 302, the distance between wing 302 and nacelle 306 gradually increases, causing expanded airflow (denoted by "−" signs).

Figure 3B:
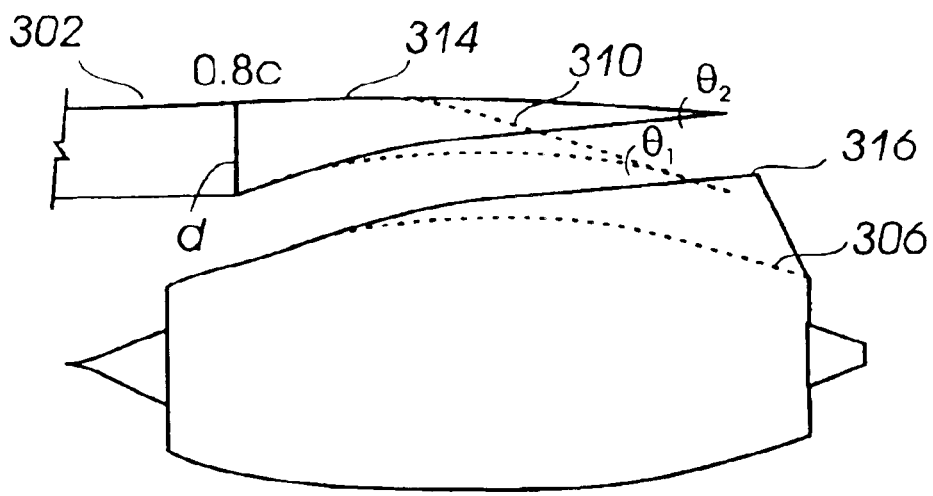
FIG. 3B shows a side view of expansion of airflow between an embodiment of a wing with a reflexed airfoil portion and an engine nacelle configured to maintain positive pressure of the airflow to the trailing edge of the wing.

Referring to FIG. 3B, it is desirable to carry lower pressure above wing 302 relative to below wing 302 to generate an expansion that reduces or even prevents aft shock coalescence at the trailing edge of wing 302. In such embodiments, wing 302 extends near the trailing edge of the aircraft on which it is mounted. A constraint limiting the pressure field under the reflexed airfoil portion 310 of wing 302 to canceling only positive pressures can be applied. To achieve higher pressure cancellation below wing 302, the distance between the lower surface of wing 302 and nacelle 306 must stay substantially the same to the trailing edge of wing 302.

FIG. 3B shows a side view of embodiments of reflexed airfoil portions 310, 314 and corresponding engine nacelles 306, 316 configured to maintain positive pressure of the airflow to the trailing edge of wing 302. In one embodiment, reflexed airfoil portion 310 is configured to maintain positive airflow pressure to the trailing edge of wing 302 by maintaining approximately the same distance between the lower surface of wing 302 and nacelle 306. Closure angle $\theta_1$ of reflexed airfoil portion 310 decreases compared to the closure angle $\theta$ of unreflexed airfoil 304 (FIG. 3A). Reducing closure angle $\theta$ generally causes wing 302 to become very thin toward the trailing edge. Thin wings 302 can cause problems such as increased aeroelasticity during maneuvers. For example, aeroelastic bending of the wing can cause the aircraft to turn one way when control surfaces are deflected to turn the aircraft the other way. Thus, the starting reflex should be selected to account for approximate closure angle constraints, even though more precise closure angle constraints are not determined until process 110, as further described herein.

Figure 4A:
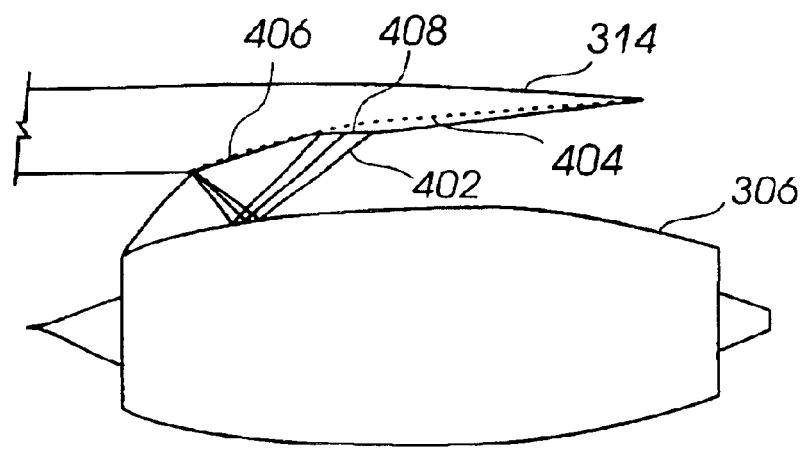
FIG. 4A shows a side view of nacelle shock reflections on a reflexed wing.

Referring now to FIGS. 1, 4A through 4C, process 104 includes approximating the boundary conditions of nacelle 306, and adjusting reflexed airfoil portion 314 based on the effects of nacelle shock expansions 402 to generate adjusted reflexed airfoil portion 404. FIG. 4A shows a side view of nacelle shock expansions 402 being cancelled by adjusted reflexed airfoil portion 404. In some embodiments, reflexed airfoil portion 404 includes one or more segments 406, 408 with different reflex slopes specifically designed to cancel nacelle shock expansions 402.

Figure 4B:
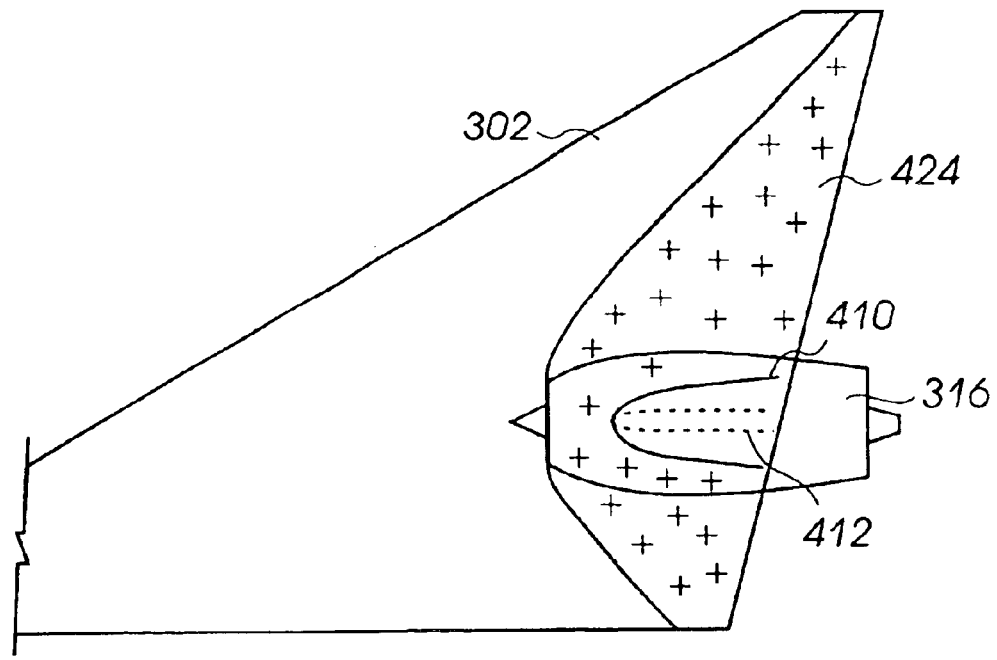
FIG. 4B shows a top view of expansion of airflow between an embodiment of a wing with a reflexed airfoil and a diverter configured to maintain positive pressure of the airflow to the trailing edge of the wing.

In FIG. 4B, a top view of wing 302 is shown with an embodiment of diverter 410 having an increased width compared to original diverter 412. Diverters 410, 412 are structural components that attach nacelle 316 to wing 302. Portions of diverters 410, 412 are typically exposed to the airflow between the lower surface of wing 302 and nacelle 316. The increased width of diverter 410 can be used in addition to varying the shape of nacelle 316 and reflexed airfoil portion 314 to maintain positive pressure region 424 of the airflow to the trailing edge of wing 302.

The effect of including the boundary conditions of nacelle 316 and diverter 410 in CFD analysis is shown in FIG. 4C, which depicts reflex depth curves 426, 428 along the wing span with and without the nacelle boundary conditions included in the CFD analysis. Including the nacelle boundary conditions, and designing reflexed airfoil portion 314 to cancel nacelle shock expansions 402 results in reflex depth curve 428, which is much closer to the desired wing thickness constraint curve 416 than reflex depth curve 426 without the nacelle boundary conditions. Additionally, the width of diverter 410 can be varied to further adjust the impact of nacelle 306 on reflex depth curve 426.

Process 106 includes determining the changes in the wing surface required to offset the pressure change introduced by shape of nacelle 316. A variety of standard CFD packages can be utilized to analyze the pressure distribution on wing 302 and nacelle 316. Examples of suitable software packages that are suitable for use in processes 102 and 106 and commercially available include CFD++ from Metacomp Technologies, Inc. in Aurora, Calif.; Hypermesh from Altair Engineering in Troy, Michigan; and Gridgen from the Aerospace Computing Laboratory at Stanford University in Palo Alto, Calif. Other suitable programs can be utilized.

Referring to FIGS. 1, and 4A–4E, linear aerodynamic theory assumes compressed airflow is re-expanded isentropically, i.e., no losses. Non-linear theory, however, accounts for losses in the speed of the airflow due to the fact that some amount of pressure is converted to heat during re-expansion. FIG. 4D illustrates examples of local Mach angle lines compared to free stream Mach angle lines. Process 108 includes correcting the free stream Mach number to the local Mach number, and smoothes reflex depth $\Delta z$ for airfoil portion 314 along local Mach angle lines. Mach angle lines can be determined with the formula $\cos^{-1}(1/M)$. In some embodiments, process 108 uses linear theory assumptions to determine shock wave distribution during a first iteration, and adds the correction to local Mach number to recalculate shock propagations and wing reflex depth along the span of wing 302 along local Mach angle lines during subsequent iterations, until the curves are removed from the reflex depth curve. FIG. 4E shows an example of a reflex depth curve 430 without a nacelle before smoothing along Mach angle lines, and reflex depth curve 432 without a nacelle after smoothing along Mach angle lines. A series of arrows is shown along unsmoothed reflex depth curve 430 to indicate the areas where constraints can be placed to achieve smoothed reflex dept curve 432.

Figure 5C:
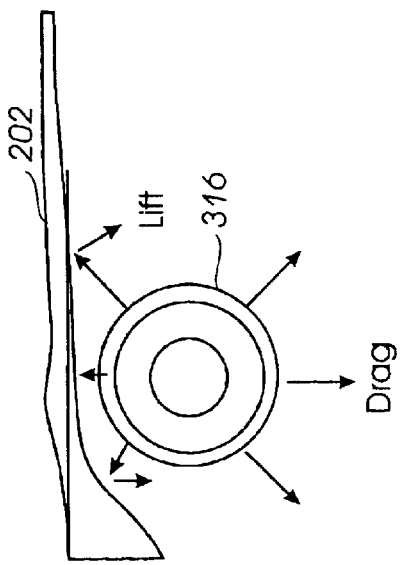
FIG. 5C shows a front view of an embodiment of an engine nacelle and a gull dihedral reflexed wing indicating lift and drag forces.
Figure 5A:
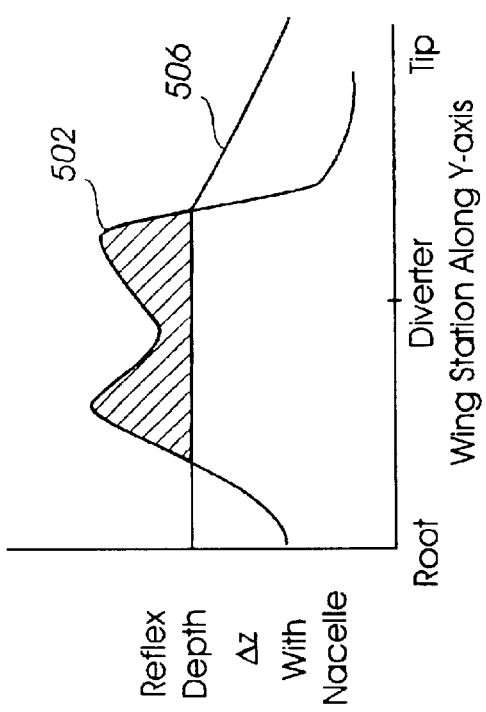
FIG. 5A shows a graphical depiction of an example of wing reflex depth along a wing span.
Figure 5B:
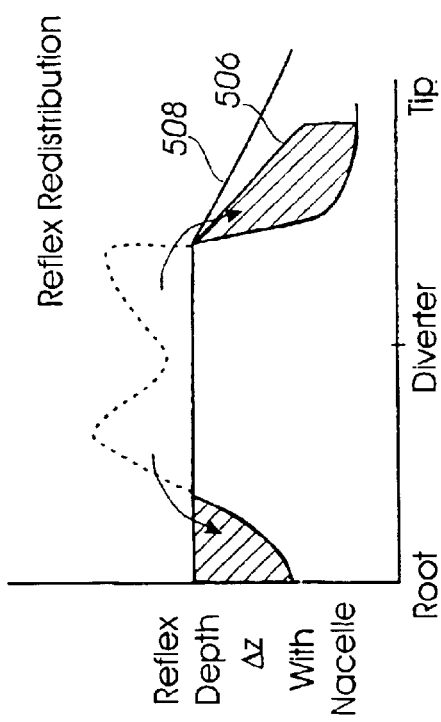
FIG. 5B shows a graphical depiction of the wing reflex depth of FIG. 5A redistributed along the wing span.

Referring now to FIGS. 1, 3B, 4D, and 5A through 5C, to avoid reducing the distance between the upper and lower surfaces of wing 302 beyond the desired thickness d, process 108 can include applying a constraint to force reflex depth curve 502 to be at or below the desired thickness curve 506, as shown in FIGS. 5A and 5B. FIG. 5A shows a graphical depiction of an example of reflex depth ($\Delta z$) curve 502 versus distance along the span of wing 302 with nacelle 316 mounted under wing 302. Reflex depth curve 502 includes raised portions adjacent both sides of diverter 410 (FIG. 4B). The increased reflex depth $\Delta z$ is required to cancel the expansion of airflow around nacelle 316 under wing 302. Curve 506 represents the desired thickness d of wing 302. As shown in FIG. 5A, reflex depth curve 502 shows the thickness d of wing 302 being below desired thickness curve 506 near the root and tip of wing 302, while the thickness of wing 302 is reduced around nacelle 316 and diverter 504 to a greater extent than desired. The amount of reflex shown by the hatched portions of reflex depth curve 502 can be redistributed along the span of wing 302 by constraining portions of the reflex within adjacent areas of grid 504 (FIG. 4D) during successive CFD iterations.

FIG. 5B shows redistributed reflex depth curve 508 that can result from process 108. As compared to reflex depth curve 502 (FIG. 5A), reflex depth curve 508 has greater reflex depth toward the root and tip of wing 302, while meeting the desired wing thickness curve 506 around nacelle 316 and diverter 410. Redistributed reflex depth curve 508 allows designers to realize the benefits of reflex airfoil portions 314 along the span of wing 302, while providing room for more structure in wing 302 to support nacelle 316. Additionally, the ability to carry lift resulting from the compressed airflow to the trailing edge of wing 302 cancels drag along the trailing edge of wing 302.

Another benefit of redistributed reflex depth curve 508 is that the drag due to nacelle 316 can be reduced by approximately one-half by putting nacelle 316 under wing 302 and canceling expansion pressures with reflexed airfoil portion 314, nacelle 316, and diverter 410. Additionally, the force from pressure under wing 302 is deflected downward, resulting in a lifting force that offsets some of the drag force from nacelle 316, as shown in FIG. 5C. In some embodiments, the pressure under wing 302 with a gull-dihedral created by reflexed airfoil portions 314 accounts for 10 to 15 percent of the total lift force, while eliminating approximately 20 percent of drag force caused by the trailing edge of wing 302 that can occur with conventional configurations.

Referring again to FIGS. 1 and 3A–3B, process 110 determines a minimum closure angle $\theta_2$ to provide the desired structural capabilities of wing 302. One consideration in determining the shape of reflexed airfoil portion 314 is that structural constraints generally require a minimum thickness between the upper and lower surfaces of wing 302, typically over a specified percentage of the distance from the leading edge to the trailing edge of the wing. The term "chord", denoted by "c", refers to a straight line from the leading edge to the trailing edge of a wing. The structural requirements can be specified as a minimum closure angle $\theta_2$ at the trailing edge of wing 302 that will result in the desired thickness d at the specified distance along chord c, such as 80 percent of the chord (0.8c).

Closure angle $\theta_2$ can be specified as a constraint in the configuration of reflexed airfoil portion 314. If the resulting reflexed airfoil portion 314 does not provide the desired thickness d for wing 302, the thickness of nacelle 316 can then be increased to maintain approximately the same distance between the lower surface of wing 302 and nacelle 316. Increasing the thickness of nacelle 316 allows a larger closure angle $\theta_2$ to avoid reducing the thickness of wing 302 beyond the desired amount.

In some embodiments, constraints on reflexed airfoil portion 314 can be defined as a minimum closure angle $\theta_2$ and a reflex angle with a slope greater than or equal to zero on the bottom surface of reflexed airfoil portion 314. Another constraint on reflexed airfoil portion 314 can be defined as the amount of reflex required to cancel a specified amount of the expansion pressure between reflexed airfoil portion 314 and nacelle 316. For example, a constraint specifying that one-half of the expansion pressure should be canceled by reflexed airfoil portion 314 can be provided. The shape of nacelle 316 can then be varied to cancel the remaining expansion pressure between reflexed airfoil portion 314 and nacelle 316.

As an example of configuring reflexed airfoil portion 314 in process 10, suppose a closure angle $\theta$ (FIG. 3A) equal to 7 degrees is required to provide the desired thickness d between the upper and lower surfaces of wing 302 at a specified wing station, such as 0.8c. The shape of reflexed airfoil portion 314 that cancels the expansion pressure can be determined by considering the minimum closure angle $\theta_2$ required to prevent the trailing edge of wing 302 from becoming too thin. In many instances, a closure angle greater than or equal to 4 degrees is considered adequate to provide structural support for the trailing edge of wing 302. In some embodiments, the upper surface of wing 302 is constrained to be substantially flat over the reflexed airfoil portion 314. Process 110 then determines the shape required for reflexed airfoil portion 314, nacelle 316, and diverter 410 (FIG. 4B) within the constraints of: minimum closure angle $\theta_2$, positive slope for the reflex angle of airfoil portion 314, desired thickness d of wing 302, and/or the desired slope of the upper surface of wing 302.

Referring now to FIGS. 1, and 4D–4E, in some embodiments, process 110 can further include chordwise and spanwise smoothing the surface of wing 302. In some embodiments, finite pressure differences are used to calculate pressure field of wing 302. Determining finite pressure differences involves dividing wing 302 into a grid 502 of rectangular areas as shown in FIG. 4D and calculating the pressure field for each area of grid 502. Discontinuities in the pressure fields can appear along the boundaries of adjacent grid areas, as depicted by reflex depth curve 430 in FIG. 4E. The discontinuities occur due to the nacelle shock wave (not shown) having a semi-parabolic shape that affects the pressure in areas of grid 502 and not others. In general, if the depth of the reflex $\Delta z$ is adjusted to smooth a portion of reflex depth curve 430, the depth of the adjacent reflex portion(s) can change unfavorably, which can create an undesired expansion pressure in a corresponding region.

Referring now to FIGS. 1, 3A–3B, and 4B, process 112 includes varying the shape of nacelle 316 and diverter 410 in three dimensions to help meet the specified constraints of maintaining positive pressure to the trailing edge of wing 302. Additionally, for aircraft with two or more engines, the left and right side portions of nacelle 316 and diverter 410 can be adjusted differently to account for the effects of the side of the fuselage. It is generally desirable to avoid configuring parts that are limited to use on only one side of an aircraft, however. Further, the process of determining shapes for reflexed airfoil portion 314, nacelle 316, and diverter 410 in process 112 typically requires more than one iteration due to the effects of other factors determined in processes 104 through 114. For example, process x104 includes accounting for the effects of shock wave reflections between reflexed airfoil portion 314 and nacelle 316. The reflections will affect the shape of reflexed airfoil portion 314, as further described herein in the discussion of process 104.

Figure 6A:
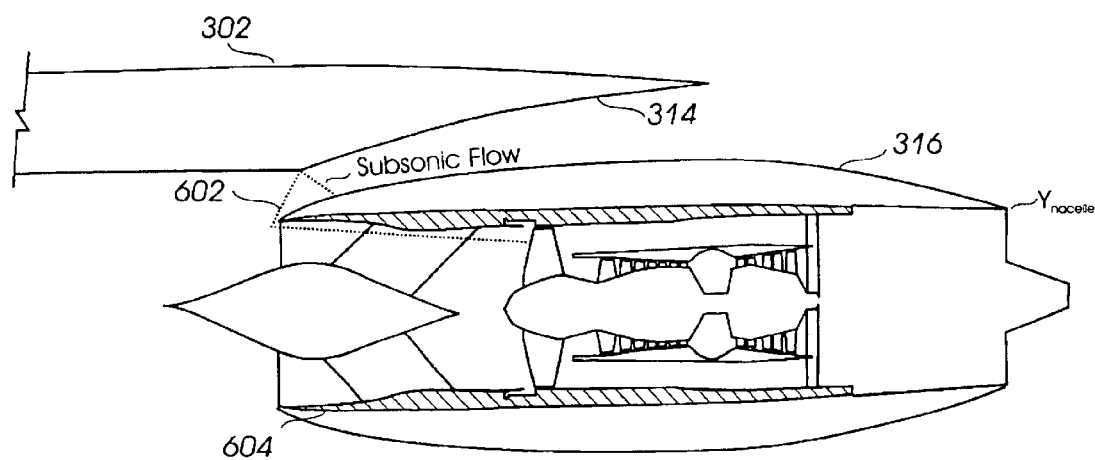
FIG. 6A shows a side view of subsonic airflow between a reflexed wing and an engine nacelle spilling into the engine inlet.

Referring now to FIGS. 1, 4A, and 6A through 6F, process 114 includes shifting reflexed airfoil portion 314 to reduce nacelle drag and choked flow between wing 302 and nacelle 316. As shown in FIG. 6A, subsonic flow that can result from nacelle shock 602 and choked flow between wing 302 and nacelle 316, can spill into the inlet of nacelle 316 and disrupt the flow in engine 604.

Figure 6B:
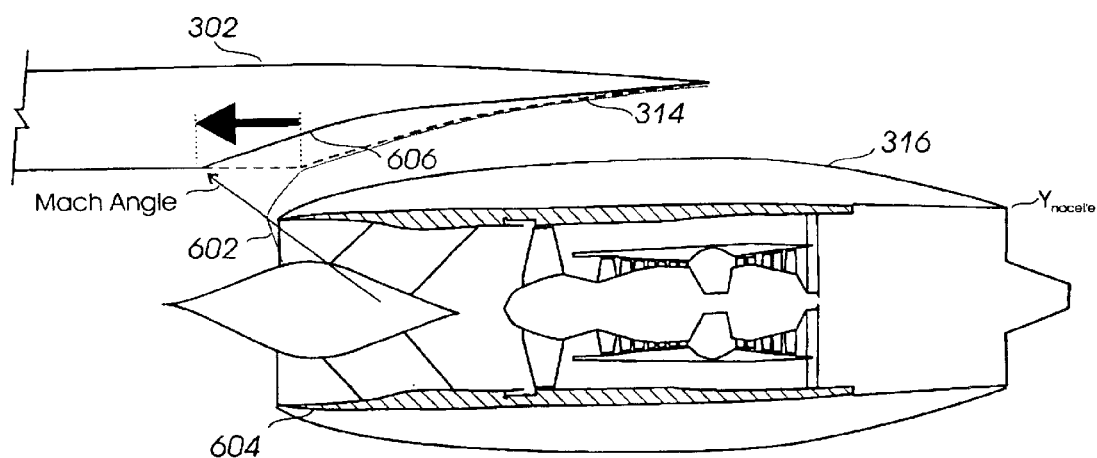
FIGS. 6B–D show side views of an embodiment of modified reflexed wing sections to prevent subsonic flow from entering the engine inlet of FIG. 6A.
Figure 6C:
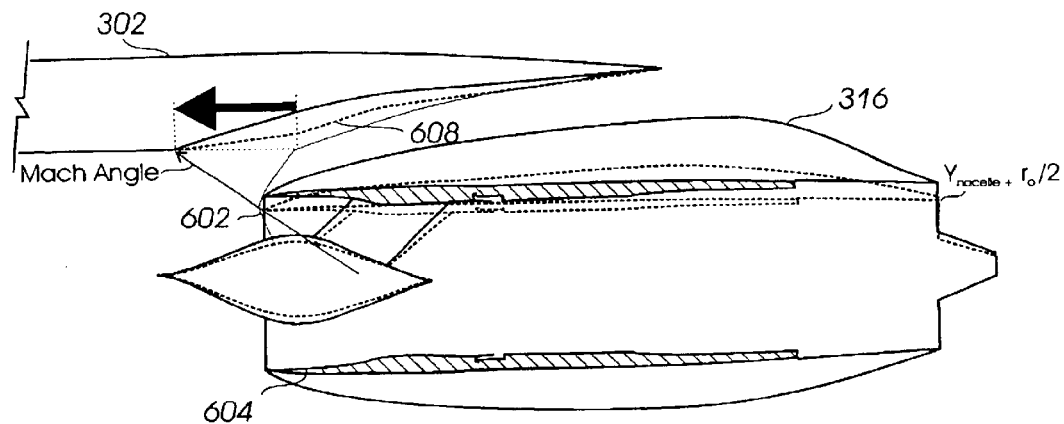
Figure 6D:
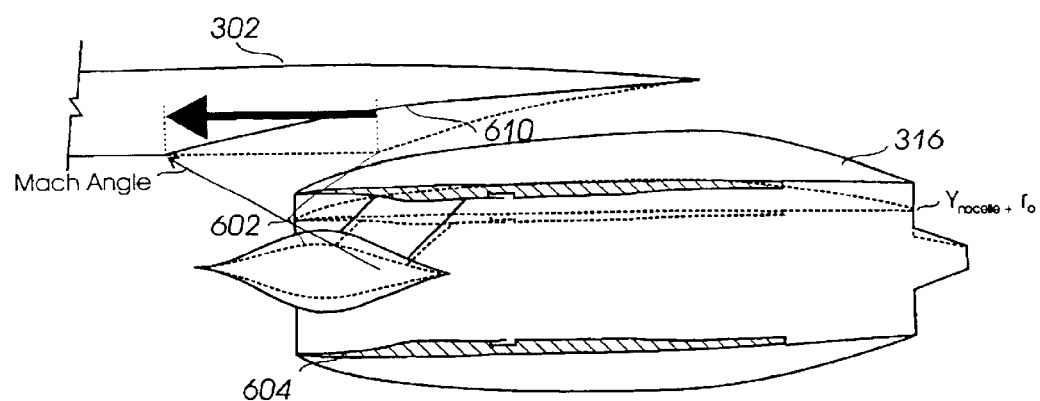
Figure 6E:
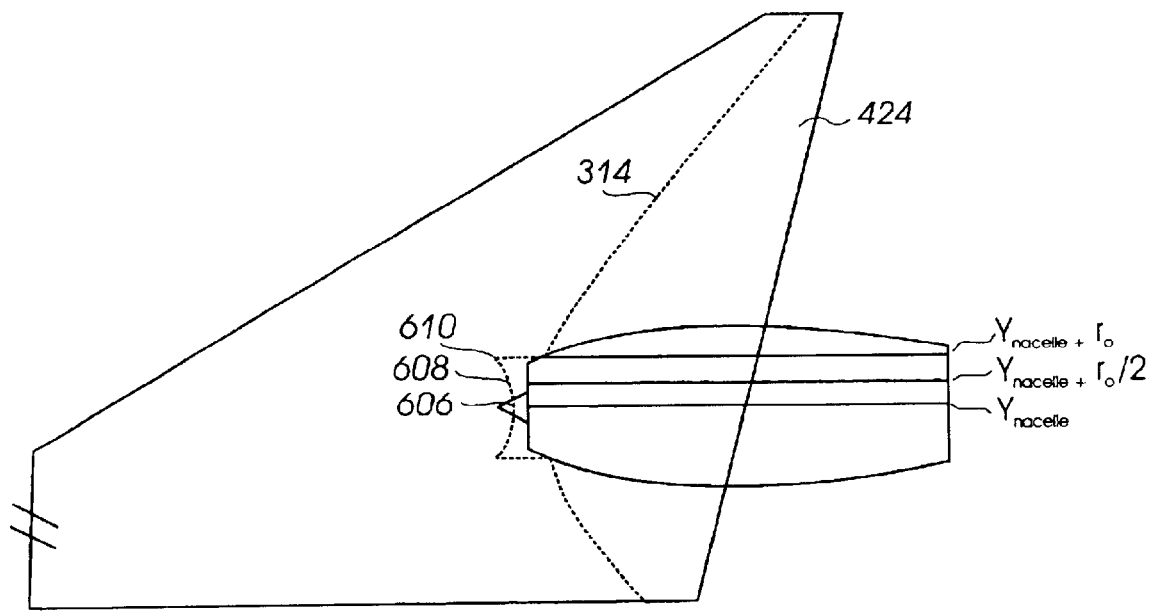
FIG. 6E shows a top view of the combined modified reflexed wing sections of FIGS. 6B–D.

FIGS. 6B through 6D show side views of embodiments of modified reflexed airfoil portions 606, 608, 610 that are designed to prevent subsonic flow from spilling over the lip of nacelle 316. The area of induced expansion created by process 114 also reduces nacelle drag. FIG. 6E shows a top view of the positions of reflexed airfoil portions 606, 608, 610 relative to nacelle 316. The positions of reflexed airfoil portions 606, 608, 610 are denoted by $Y_{nacelle}$, $Y_{nacelle+r_0/2}$, $Y_{nacelle+r_0}$, respectively, where $r_0$ is the radius of nacelle 316.

Reflexed airfoil portions 606, 608, 610 are shifted increasingly forward of the inlet of nacelle 316. The amount of shift at each location $Y_{nacelle}$, $Y_{nacelle+r_0/2}$, $Y_{nacelle+r_0}$, respectively, is based on the change of the reflex slope required to cancel the compression of nacelle shock 602. The slope change is approximately the same as that required to cause the pressure of the airflow to go to ambient when expansion from nacelle shock 602 meets the surface of reflexed airfoil portions 606, 608, 610. FIG. 6C shows reflexed airflow portion 608 with different slopes that are designed to cancel expansions from nacelle shock 602.

Figure 6F:
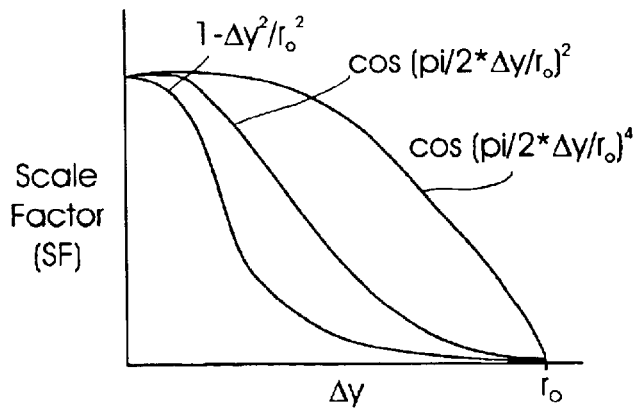
FIG. 6F shows embodiments of possible transition fairings to configure the reflexed airfoil portion.
Figure 7A:
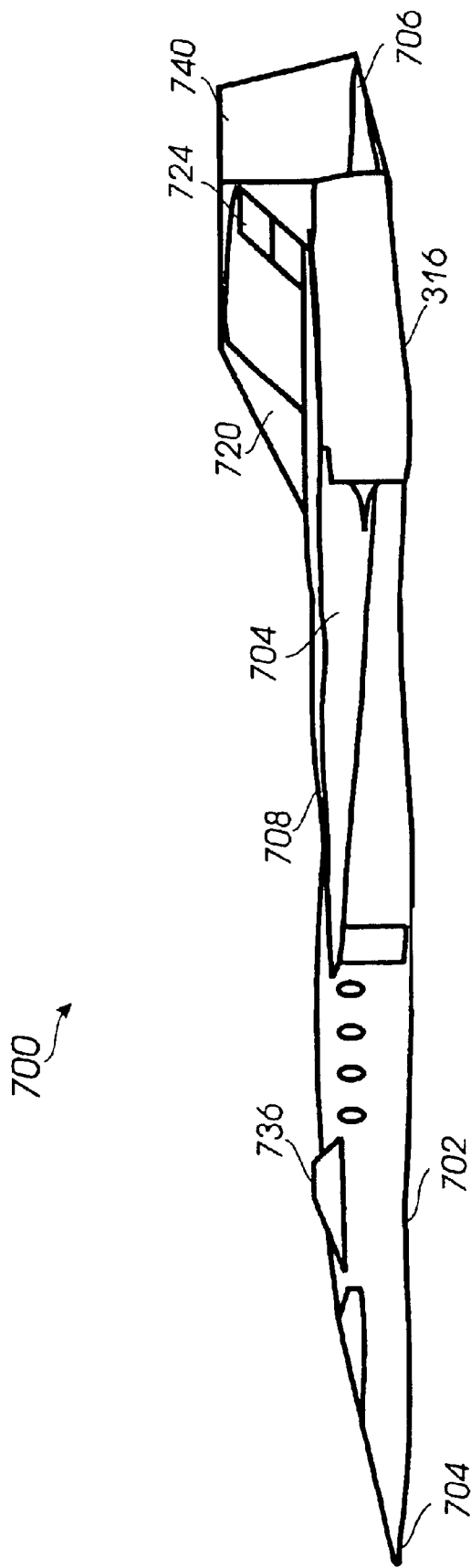
FIGS. 7A, 7B, and 7C are diagrams showing side, front, and top views of an embodiment of a supersonic aircraft that can utilize the integrated reflexed airfoil portion and engine nacelle shown in FIG. 2B.
Figure 7B:
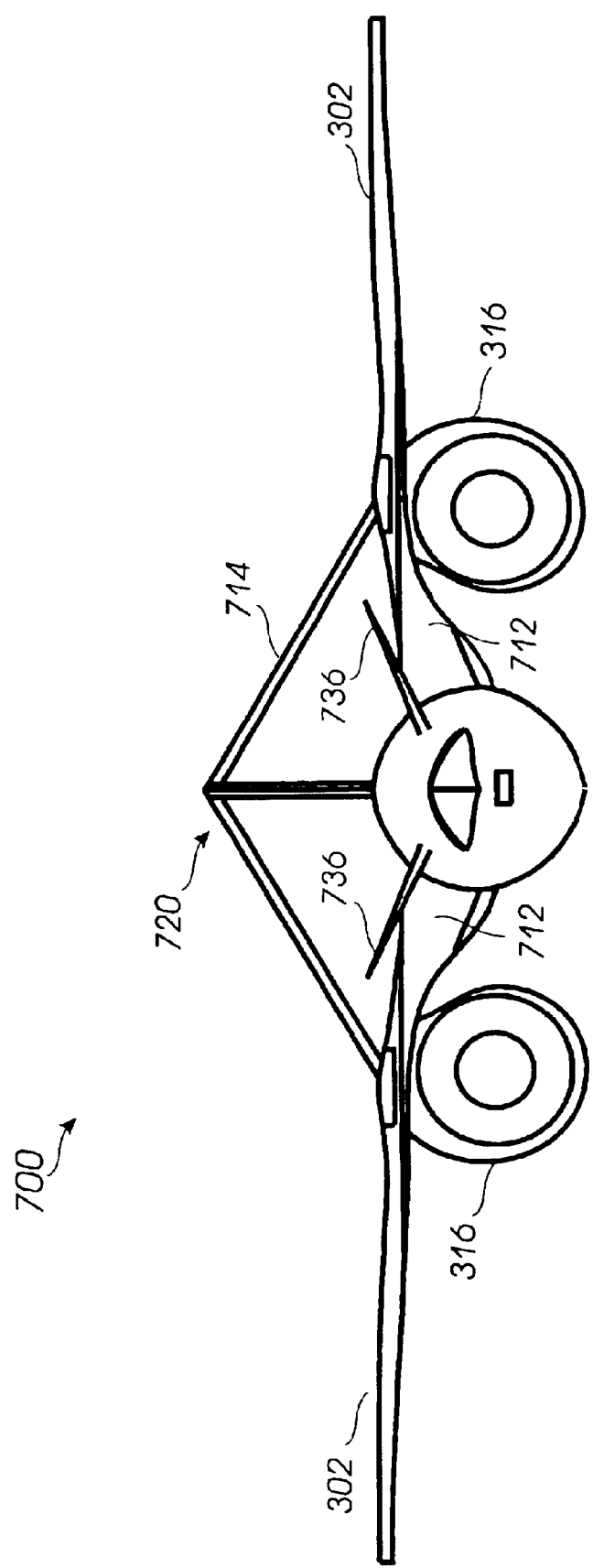
Figure 7C:
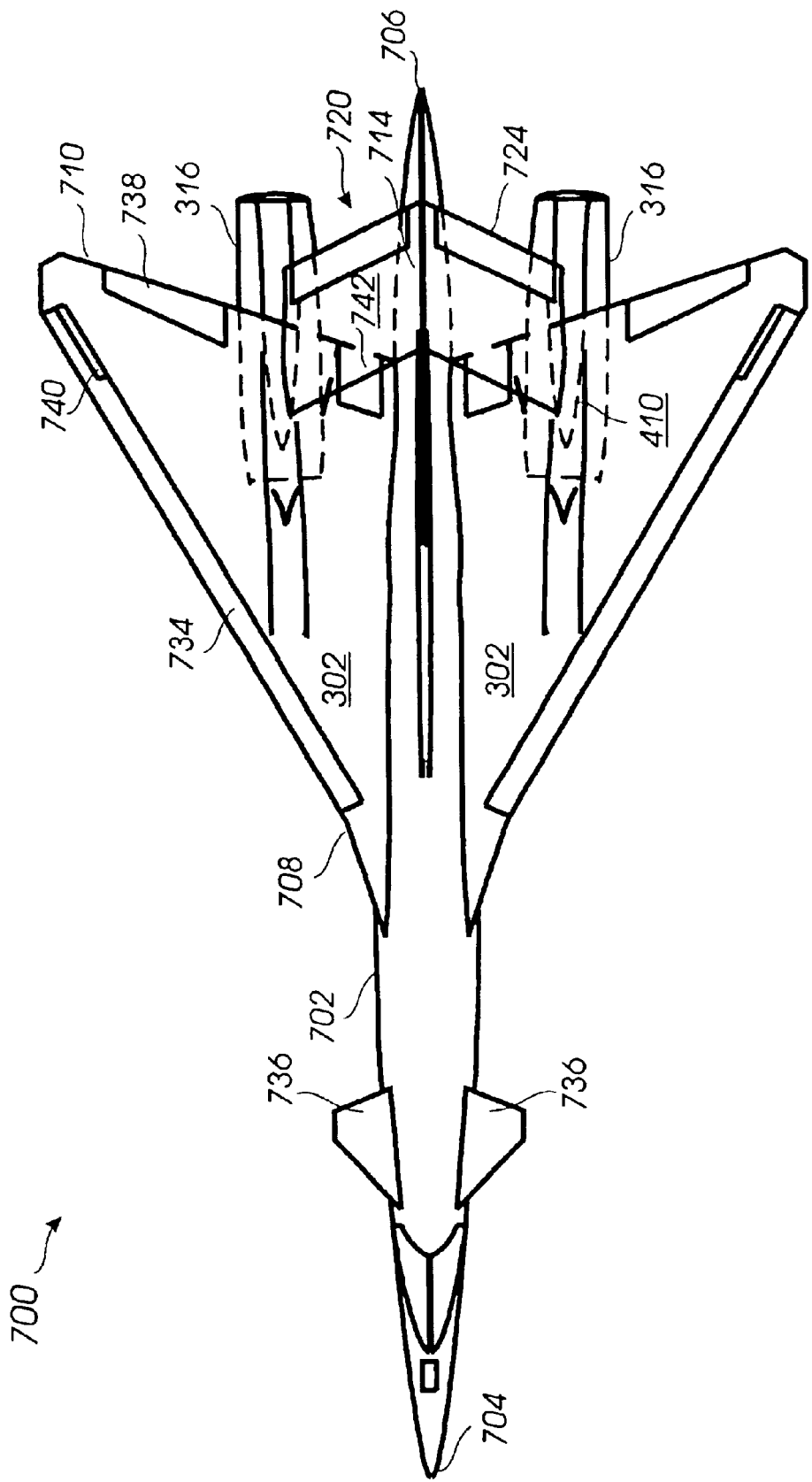

FIG. 6F shows embodiments of possible transition fairings between modified reflexed airfoil portions 606, 608, 610 of FIGS. 6B through D. Other suitable transition formulas can be utilized, however. In the examples shown, the shape of reflexed airfoil portions between reflexed airfoil portions 606, 608, and 610 can be determined using the formula:

$$\Delta z = \Delta z_{new} SF + \Delta z_{old}(1-SF),$$

where SF (scale factor) can be computed using one of several formulas, depending on how quickly the transition is made. Examples of scale factor formulas that can be utilized include:

$$SF_1 = (1-\Delta y^2/r_0^2)$$

$$SF_2 = \cos(pi/2 * \Delta y/r_0)^2$$

$$SF_3 = \cos(pi/2 * \Delta y/r_0)^4$$

$SF_1$ formula results in the quickest transition to the new reflexed airfoil portion, while $SF_1$ is the slowest transition. In some embodiments, $SF_3$ is utilized toward the edge $r_0$ of nacelle 316 because there is not a substantial amount of flow confined between wing 302 and nacelle 316. In other embodiments, $SF_1$ is used in the vicinity of $Y_{nacelle}$; $SF_2$ is used in the vicinity of $Y_{nacelle}+r_0/2$; and $SF_3$ is used in the vicinity of $Y_{nacelle}+r_0$.

Referring to FIGS. 3B, 7A, 7B, and 7C, side, front, and top views, respectively of an embodiment of a supersonic aircraft 700 that can utilize reflexed airfoil portions 314 integrated with engine nacelles 316 for sonic boom reduction are shown. Aircraft 700 comprises fuselage 702 extending on a longitudinal axis from nose 704 to tail 706. Wings 302 are coupled at respective inboard sections to fuselage 702 and extend to outboard wing tips. Wings 302 have leading edges 708 and trailing edges 710 and includes gull dihedral portions 712 with inboard dihedral primarily at trailing edges 710 while maintaining straight inboard wing sections forward of the trailing edge dihedral. Gull dihedral portions 712 are configured to extend lifting length and reduce sonic boom effects. Gull dihedral portions 712 can be configured by adjusting the twist and camber of wings 302 to produce low-boom and low induced drag.

In some examples, aircraft 700 has twin non-afterburning turbofan engines (not shown) set below and behind wings 302. The non-afterburning turbofan engines operate behind fixed-geometry axisymmetric external compression inlets. Nacelles 316 enclose the engines and are coupled to the lower surface of wings 302.

In some embodiments, aircraft 700 includes an inverted V-tail 714 that generates additional aft lift to improve aerodynamics and reduce sonic boom disturbances during cruise flight conditions, as well as providing structural support for wings 302 and engine nacelles 316. Supersonic aircraft 700 creates an N-shaped pressure wave caused by overpressure at nose 704 and underpressure at tail 706. Pressure rises rapidly at nose 704, declines to an underpressure condition at tail 706, and then returns to ambient pressure.

The shape of supersonic aircraft 700, including aspects of wing 302, tail assembly or empennage 720, and reflexed airfoil portion 314 integrated with engine nacelle 316, are adapted according to sonic boom signature and supersonic cruise drag considerations. In some embodiments, a portion of nose 704 can be blunted to create a pressure spike ahead of the aircraft forward shock, which raises local temperature and sound velocity, thereby extending the forward shock and slowing the pressure rise. Wings 302 can have a sharply swept delta configuration that reduces peak overpressure by spreading wing lift along the length of aircraft 700. Wings 302 can also include reduced leading and trailing edge sweeps. Inverted V-tail control surfaces, termed ruddervators 724, adjust aircraft longitudinal lift distribution throughout the flight envelope to maintain a low boom, low drag trim condition.

In some embodiments, the leading edges of wings 302 have a substantially straight geometry to accommodate Krueger flaps 734 that extend substantially the full length of wings 302. Wings 302 integrate with nacelles 316 and diverters 410, and follow the fuselage contour with a substantially normal intersection to reduce interference drag. An inboard wing flap hinge line is fully contained within the wing contour with upper and lower wing surfaces configured as planar as possible to facilitate aerodynamic performance.

Gull dihedral portions 712 raise the engines to increase available tip-back angle and reduce thrust-induced pitching moments. Gull dihedral portions 712 lower fuselage 702 to reduce the cabin door height above the ground and reduce entry stair length. Fuselage 702 sets a low aircraft center of gravity, reducing tip-over angle and promoting ground stability. Gull dihedral portions 712 form partial shrouds around nacelles 216, enhancing favorable interaction between nacelles 216 and wings 302. In addition, gull dihedral portions 712 enhance the aircraft low-boom signature by vertically staggering the longitudinal lift distribution of wings 302.

In some embodiments, supersonic aircraft 700 can include canards 736 on both sides of fuselage 702 that operate primarily as longitudinal power control devices, particularly during takeoff and high-speed flight. Canards 736 also fine tune the aircraft longitudinal trim condition and augment rudder operation by supplying yaw control power when canards 736 are deflected differentially.

Supersonic aircraft 700 further includes segmented ailerons 738 that supply roll control power and automatic wing camber control to improve lift and drag conditions through the flight envelope. High-speed spoilers 740 supplement aileron roll power at transonic and supersonic speeds where Mach and aeroelastic effects reduce aileron effectiveness. Supersonic aircraft 700 has a high lift system including inboard trailing edge flaps 742 and full-wingspan leading edge Krueger flaps 734.

Canards 736 and symmetric deflections of the ruddervators 724 control pitch power. Rudder 750 controls yaw. Inboard, mid-board and outboard ailerons 738, and high speed spoilers 740 control roll at both subsonic and supersonic speeds. In an illustrative embodiment, trailing edge (TE) flaps 742 are deployed 30° down to generate additional lift during landing. TE flap deployment reduces angle-of-attack by approximately 2° during landing. During second-segment climb, the TE flaps 742 can be extended up to 70° to improve the lift-to-drag ratio for better climb performance.

Leading edge (LE) Krueger flaps 734 can be extended up to 130° for low speed operations including takeoff, approach and landing. The LE Krueger flaps 734 can improve lift-to-drag ratio by 1.5, resulting in better climb performance that facilitates second-segment climb in case of engine malfunction.

Some of the control surfaces on supersonic aircraft 700 can perform multiple functions. For example, ruddervators 742 enable continued operation and landing following single actuator failure or jammed control surface. Differential deflection of canards 736 can generate a yawing moment to counter a jammed rudder 750. Ailerons 738 and ruddervators 724 include multiple surfaces, increasing fault tolerant capability and supplying redundant control elements for improved reliability.

Referring again to FIG. 1, processes 102 through 114 can be iterated until all of the constraints have been met. In some situations, a subset of processes 102 through 114 can be iterated to closure before proceeding on to the other processes. Additionally, once all of processes 102 through 114 have been executed, it may be necessary to loop through the processes again to meet all of the specified constraints.

In some embodiments, an interactive aircraft design system with logic instructions that implement at least some of functions of processes 102 through 114 can be provided. The logic instructions can be implemented in software and distributed over an information network or suitable computer-readable media as a software application program that can be installed on a personal computer, a centralized server, or other suitable computer system. The logic instructions can also be implemented in hardware, firmware, and/or a combination of hardware, firmware and software. A user interface can also be provided to enable a designer to enter suitable constraints and design parameters, and view the results, including the shapes of reflexed airfoil portion 314 and nacelle 316. The user interface can also provide instructions for using the system, possible design parameters that can be varied, as well as assistance in interpreting the results. The results can be formatted and output for use in other design systems, such as computer-aided design and drawing systems, to easily share the results of the design effort.

While the present disclosure describes various embodiments, these embodiment are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed is:

1. A method for integrating an engine nacelle under a wing for a supersonic aircraft comprising:
constraining the pressures under a reflexed airfoil portion of the wing to canceling only positive pressures, wherein the reflexed airfoil portion includes a convergent section thickness of the underside of the wing that begins at an intermediate location between the leading edge and the trailing edge of the wing, and extends to the trailing edge of the wing, and the shape of the convergent section thickness is formed with at least one reflex angle;
constraining the slope of the at least one reflex angle of the reflexed airfoil portion proximate the trailing edge of the wing to values greater than or equal to zero; and
determining the at least one slope of the reflex angle that meets the pressure and reflex angle slope constraints.

2. The method according to claim 1 further comprising:
determining the pressure under the reflexed airfoil portion using finite pressure difference calculations; and
smoothing the shape of the reflexed airfoil portion along the local Mach angle lines.

3. The method according to claim 1 further comprising:
determining the shape of the reflexed airfoil portion along the span of the wing with and without accounting for the nacelle boundary conditions.

4. The method according to claim 1 further comprising:
modifying the shape of the nacelle to meet the pressure constraint.

5. The method according to claim 1 further comprising:
redistributing the depth of the reflexed airfoil portion such that the reflex depth is at or below a desired wing thickness curve across at least a potion of the span of the wing.

6. The method according to claim 1 further comprising:
initializing computational fluid dynamics iterations with an approximate reflexed airfoil portion.

7. The method according to claim 3 further comprising:
adjusting the reflexed airfoil portion based on nacelle shock reflections.

8. The method according to claim 1 further comprising:
shifting the start of the reflexed airfoil portion in front of the inlet of the nacelle to reduce spillage of subsonic airflow in the inlet.

9. An aircraft comprising:
a wing with a non-movable reflexed airfoil portion, wherein:
the reflexed airfoil portion includes a convergent section thickness of the underside of the wing that begins at an intermediate location between the leading edge and the trailing edge of the wing, and extends to the trailing edge of the wing,
the shape of the convergent section thickness is defined by at least one reflex angle, and
the slope of the at least one reflex angle is greater than or equal to zero proximate the trailing edge of the wing.

10. The aircraft according to claim 9 wherein;
the wing includes an inboard gull dihedral portion.

11. The aircraft according to claim 9 wherein:
a subsection of the reflexed airfoil portion is shifted in front of the inlet of the nacelle to prevent spillage of subsonic flow into the inlet.

12. The aircraft according to claim 9 further comprising:
an engine nacelle with increased thickness between the reflexed airfoil portion and the nacelle, wherein the increased thickness of the nacelle is shaped to maintain positive pressure under the reflexed airfoil portion to the tailing edge of the wing.

13. The aircraft according to claim 9 wherein:
a diverter coupled between the nacelle and the wing, wherein the diverter is shaped to maintain positive pressure under the reflexed airfoil portion to the trailing edge of the wing.

14. An aircraft design system comprising:
logic instructions operable to:
determine the shape of a reflexed airfoil portion of a wing, wherein the reflexed airfoil portion is a convergent section thickness of the underside of the wing that begins at an intermediate location between the leading edge and the trailing edge of the wing, and extends to the trailing edge of the wing, and the shape of the convergent section thickness is formed with at least one reflex angle;
allow the user to constrain the pressures under the reflexed airfoil portion to canceling only positive pressures; and
allow the user to vary the thickness of a nacelle under the wing to meet the pressure constraint.

15. The system according to claim 14 further comprising:
logic instructions operable to:
allow the user to constrain the slope of the at least one reflex angle of the reflexed airfoil portion proximate the trailing edge of the wing to values greater than or equal to zero; and
determine the at least one slope of the reflex angle that meets the pressure and reflex angle slope constraints.

16. The system according to claim 14 further comprising:
logic instructions operable to:
determine the pressure under the reflexed airfoil portion using finite pressure difference calculations; and
smooth the shape of the reflexed airfoil portion along the local Mach angle lines.

17. The system according to claim 14 further comprising:
logic instructions operable to:
determine the shape of the reflexed airfoil portion along the span of the wing with and without accounting for the nacelle boundary conditions.

18. The system according to claim 14 further comprising:
logic instructions operable to:
redistribute the depth of the reflexed airfoil portion such that the reflex depth is at or below a desired wing thickness curve across at least a portion of the span of the wing.

19. The system according to claim 14 further comprising:
logic instructions operable to;
initialize computational fluid dynamics iterations with an approximate reflexed airfoil portion.

20. The system according to claim 17 further comprising:
logic instructions operable to:
adjust the reflexed airfoil portion based on nacelle shock reflections.

21. The system according to claim 14 further comprising:
logic instructions operable to:
shift the start of the reflexed airfoil portion in front of the inlet of the nacelle to reduce spillage of subsonic airflow in the inlet.

* * * * *